(No Model.)

O. H. BASQUIN.
MOLD FOR PRISM LIGHTS.

No. 595,258. Patented Dec. 7, 1897.

Witnesses:
Frank S. Blanchard
H. R. White

Inventor:
Olin H. Basquin
By David W. Parker,
Attorney.

UNITED STATES PATENT OFFICE.

OLIN H. BASQUIN, OF CHICAGO, ILLINOIS, ASSIGNOR TO THE LUXFER PRISM PATENTS COMPANY, OF SAME PLACE.

MOLD FOR PRISM-LIGHTS.

SPECIFICATION forming part of Letters Patent No. 595,258, dated December 7, 1897.

Application filed April 19, 1897. Serial No. 632,713. (No model.)

*To all whom it may concern:*

Be it known that I, OLIN H. BASQUIN, a citizen of the United States, residing at Chicago, in the county of Cook and State of Illinois, have invented certain new and useful Molds for Prism-Lights, of which the following is a description.

My invention relates to molds for molding glass or the like, and has for its object to provide a new and improved mold particularly adapted for forming prism-lights and the like.

My invention is illustrated in the accompanying drawings, wherein—

Figure 1:
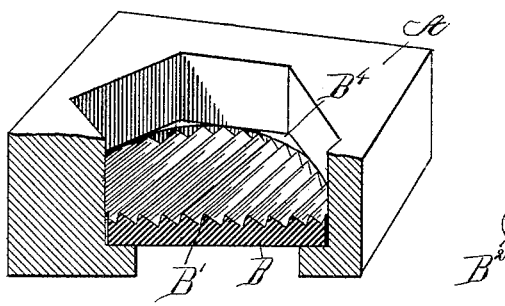
Figure 2:
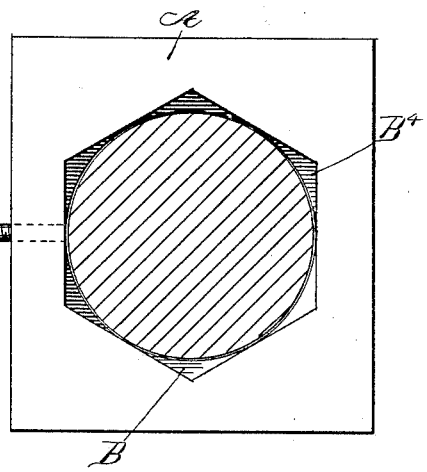
Figure 3:
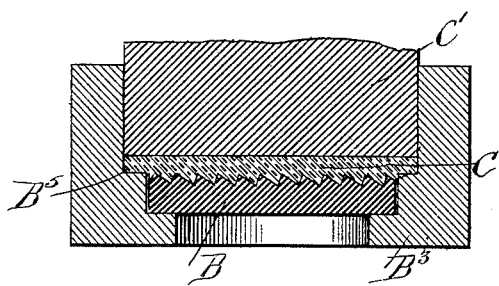
Figure 4:
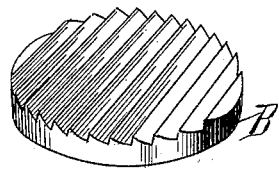
Figure 5:
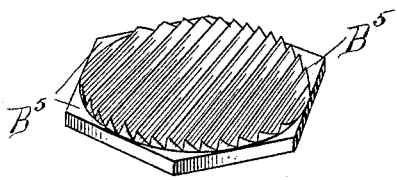

Figure 1 is a perspective view, in part sections, of a mold embodying my invention. Fig. 2 is a plan view of same. Fig. 3 is a vertical section through the mold, showing the molded article in position. Fig. 4 is a perspective view of the bottom of the mold. Fig. 5 is a perspective view of a prism-light formed with this mold.

Like letters refer to like parts throughout the several figures.

The mold proper, A, is provided with a movable bottom or receiving-piece B, adapted to make contact with the article molded. This receiving-piece B is provided with a series of projecting ribs or prisms B' and is adapted to be moved with relation to the mold. This piece B is preferably provided with some holding device—as, for example, the screw $B^2$—so that it may be held in any desired position while the mold is being used. As illustrated in the drawings, the receiving-piece B rests upon the projecting ledge $B^3$ and is surrounded by the ledge or face $B^4$, which forms the surfaces $B^5$ on the prism-light.

By varying the position of the piece B the relative position of the surfaces $B^5$ and the prisms may be changed, or, in other words, the angular position of the prisms with relation to the edges of the prism-plate may be varied at will.

In Fig. 3 I have shown the mold with the prism-light C therein, said prism-light interposed between the plunger or part C' and the piece B.

In the drawings I have illustrated a particular form of my device in order to make its application clear, but it is of course evident that the form, construction, and arrangement of the several parts may be greatly varied. I have only attempted to illustrate my device diagrammatically, as it were, and in one of its simplest forms. I therefore do not wish to be limited to the construction shown.

I claim—

A mold for forming prism-lights so that the body of such prism-light shall have a non-circular periphery, while the body of prisms thereon shall be in the shape of an inscribed circle, comprising a two-part mold, one part adapted to hold and form the non-circular prism-light body, the other part adapted to hold and form the inscribed circularly-outlined body of prisms, said two parts movable with reference to each other about a vertical central axis passing through both, and means for securing them in any desired position so as to form the prisms at any desired angle with any edge of the non-circular body.

OLIN H. BASQUIN.

Witnesses:
 DONALD M. CARTER,
 BERTHA C. SIMS.